United States Patent [19]

Engdahl et al.

[11] Patent Number: 5,620,596
[45] Date of Patent: Apr. 15, 1997

[54] FALLING FILM CROSS FILTRATION APPARATUS

[75] Inventors: Holger Engdahl; Pekka Tormikoski, both of Savonlinna, Finland

[73] Assignee: Ahlstrom Machinery Oy, Helsinki, Finland

[21] Appl. No.: 433,348

[22] PCT Filed: Oct. 27, 1994

[86] PCT No.: PCT/FI94/00485

§ 371 Date: Jun. 1, 1995

§ 102(e) Date: Jun. 1, 1995

[87] PCT Pub. No.: WO95/12446

PCT Pub. Date: May 11, 1995

[30] Foreign Application Priority Data

Nov. 2, 1993 [FI] Finland ................................... 934853
Mar. 14, 1994 [FI] Finland ................................... 941194

[51] Int. Cl.⁶ ........................................... B01D 29/00
[52] U.S. Cl. ..................... 210/188; 210/194; 210/197; 210/323.2; 210/332; 210/409; 210/416.1; 210/456
[58] Field of Search ............................. 210/767, 800, 210/808, 348, 323.2, 384, 391, 405, 409, 412, 416.1, 188, 194, 197, 332, 456

[56] References Cited

U.S. PATENT DOCUMENTS

3,696,933 10/1972 Pall et al. .
3,835,999 9/1974 Moore .
5,008,009 4/1991 Ciaffoni .

FOREIGN PATENT DOCUMENTS

500109 2/1992 European Pat. Off. .
1290159 9/1972 United Kingdom .
1374109 11/1974 United Kingdom .
1466094 3/1977 United Kingdom .

OTHER PUBLICATIONS

Engdahl et al, "Clarification of Green Liquor by a Falling Film . . . ", Paper and Timber vol. 76/No. 5/1994, pp. 326–329, May 24, 1994.

*Primary Examiner*—Robert J. Popovics
*Attorney, Agent, or Firm*—Nixon & Vanderhye P.C.

[57] ABSTRACT

A cross-flow filtration apparatus is able to produce cleaner liquid, especially in the filtration of green liquor, then is typically possible. A housing contains a number of vertical filter elements each having a filter surface with first and second sides which are substantially free of filter cake. A higher gas pressure is provided on the first sides of the filter surfaces than the second sides, and filtered liquid passes through the filter surface from the first side to the second side. A first conduit withdraws filtrate from the second side of at least one of the surfaces, and a second conduit withdraws suspension liquid from adjacent the bottom of the filter elements and typically (though not necessarily) recirculates it. Suspension is introduced—such as in a tray with a perforated bottom mounted above the filter elements, and/or the nozzles—so that the suspension flows in a falling film down the first sides and in contact with them, so that filter cake does not form during operation. A sludge vessel is typically connected to the second conduit external of the housing, and an open dregs vessel distinct from the sludge vessel may be connected to a bottom portion of the housing.

19 Claims, 3 Drawing Sheets

FALLING FILM CROSS FILTRATION APPARATUS

BACKGROUND AND SUMMARY OF THE INVENTION

The present invention relates to a method of filtering suspension and an apparatus for realizing said method. The present invention may be applied for filtering green liquor containing finely divided matter, generated, for example, in the chemical circulation of a pulp mill.

A significant subprocess in the manufacture of sulphate cellulose is the recovery of cooking chemicals. Part of said regeneration is formed by the manufacture of white liquor by causticizing, whereby lime milk and green liquor are allowed to react in order to form lime sludge and white liquor. The green liquor is generated when a chemical melt containing sodium chemicals is led from the bottom of the furnace of a soda recovery boiler to a separate dissolving vessel, in which the melt is dissolved in a dilute liquor. The most significant sodium chemicals of the green liquor are sodium carbonate and sodium sulphide. The green liquor also contains insoluble compounds, such as metal oxides, silicates, soot and other impurities. Said dregs containing impurities must be discharged from chemical circulation, since the dregs otherwise concentrates in the chemical circulation and disturbs the manufacture of white liquor in causticizing. The cleaning of green liquor is generally performed in clarifiers. When the mills become larger and the environmental regulations more stringent cleaning by sedimentation principle results in large apparatuses, the diameters of which exceed 30 meters. Moreover, clarifiers are always liable to disturbances, whereby too impure green liquor is obtained even from the correctly dimensioned apparatuses.

An alternative method is to clean green liquor by filtering. Since the dregs mainly consist of finely divided matter, the filterability of which is poor and which rapidly clog the filtering surface, said method results in a filtering apparatus, which has a large surface area and is thus expensive. A cake containing fine particles must thus be removed from the surface often, whereby it, of course, remains thin. When such a cake is washed off, a very dilute sludge is obtained, which must be further concentrated in several process stages.

In order to improve the filterability, for example, lime sludge obtained from the causticizing process is used as filtration aid, by means of which a filtering layer having good filtering capacity when filtering finely divided green liquor is formed on the surface of the filter element. Said method results, however, in additive costs and increased amount of waste being transported to a landfill site.

The filterability of a suspension, which is difficult to filter, has been suggested to be improved also in such a way that the formation of a filter cake on the filtering surfaces is prevented by removing separated solids by causing a strong shear force on the suspension close to the filtering surface, which mixes solids back to the suspension to be filtered. The problem with this cross-flow filtration has been large liquid volumes, which must be circulated in order to generate sufficient velocity and turbulence to remove the separated solids from the filtering area.

The purpose of the present invention is to provide a filtering method and apparatus, by means of which said disadvantages may be eliminated. The present invention provides thus a simpler and more economic method and apparatus for filtering liquid-solids suspensions, especially those which have so far been difficult to filter. Although the background of the problem has been discussed above in view of the green liquor, it is apparent that it is only an example and that the invention may be applied to be used also for filtering other liquid-solids suspensions, such as kaolin sludge, clarified white liquor, soda liquor, bleaching effluent of cellulose and white water.

In the present filtering method the suspension to be filtered is brought into contact with the filtering surface of the filter element, whereby due to the pressure difference across the filtering surface the filtrate flows through the filtering surface and the separated solids substantially remains in the suspension. It is a characteristic feature of the invention that the suspension to be filtered is brought to flow downwards on the filtering surface, whereby the filtration takes place from the film flowing on the filtering surface.

An apparatus in accordance with the present invention comprises a number of filter elements, through the filtering surface of which the filtrate flows while the separated solids substantially remain in the suspension, whereby the filter is provided with at least means for passing the suspension to be filtered to the filtering surfaces and for removing the filtrate. It is a characteristic feature of the invention that the means for passing the suspension to be filtered are arranged in such a way that the suspension is brought to the upper part of each filtering surface to flow downwards on the filtering surface.

According to a preferred embodiment a filter is provided with means for recirculating the non-filtered suspension to the upper part of the filtering surface.

The present invention realizes the cross-flow filtration in a new manner, whereby shear forces preventing generation of solids cake on the filtering surface is carried out by passing suspension to be filtered to flow due to the gravitational force during the filtration down on the filtering surface. Due to the pressure difference part of the liquid is filtered there from the falling film through the filtering surface.

A continuous downwards flowing liquid film is most suitably generated by recirculating non-filtered suspension to the upper part of the filtering surface and the suspension to be filtered is supplied and mixed to the circulation flow. The generation of an even liquid film on the filtering surface requires rather large liquid amounts, generally larger than what flows into the apparatus, and that is why the recirculation of the suspension is necessary for having an efficient filtration.

All arrangements, in which the invention may be realized, are applicable for filter element in a filter according to the present invention. Such elements are most preferably a lamella, a tube and a disc. Most usually the filtrate is discharged through a filter channel inside the element, such as a tube. If so desired, the suspension to be filtered may be passed into the element, whereby the filtration takes place in an opposite direction.

The separated solids tend to accumulate on the filtering surface. By maintaining the flow velocity high enough the generation of the solids layer may be completely prevented, since separating solid particles are entrained with the falling liquid. If a solids layer tends to be generating, it may be prevented by lowering the pressure difference for a moment, whereby the flow through the filtering surface ends or slows down and the "grip" of the layer from the filtering surface loosens and it gets loose to flow with the suspension flow. In order to remove the harmful solids cake flow in the falling film may be intensified also locally in a restricted area at a time. The increase of the flow is generated by means of one or more liquid jets.

The attachment of solids on the filtering surface may also be prevented by vibration. There are both mechanic and acoustic of such vibration apparatuses known per se.

The suspension to be filtered is brought to distribute on the filtering surface in the same way as in the falling film evaporators. A liquid distribution tray, a perforated plate or like device, to which the suspension to be filtered is passed and the bottom of which is provided with openings, through which the suspension is allowed to flow evenly on the filtering surfaces, may be arranged above the filter elements.

The pressure difference across the filtering surface may be generated by joining the filter to an apparatus known per se in order to generate a vacuum. The filter elements may thereby be assembled in an atmospheric vessel or freely in atmosphere.

A required pressure difference may be maintained also by pressurizing the pressure vessel filter with gas. The gas may be arranged in a closed circulation system. The applied gas may be inert or reactive relative to the suspension to be filtered. Reactive gas is added, when so desired, during the filtration in order to realize desired reactions.

The gas possibly penetrating the filtering surface may be separated from the filtrate either in the filter element by removing it from a separate conduit than the filtrate, most preferably from above the liquid surface through the upper part of the element, or in a separate vessel outside the filter.

The filtration may take place either continuously or batch-wise. In continuous filtration new suspension is supplied, and thickened suspension is discharged continuously. If, however, as clean dregs as possible are desired to be obtained, which with green liquor means efficient alkali removal from the dregs, it is possible to perform the filtration batchwise.

In batch process non-filtered suspension is not discharged continuously, but the feed of the suspension is stopped during the filtration and the suspension is allowed to be thickened by recirculating. Thereafter washing water is supplied to the filter and filtration continues. The washing water being mixed with the dregs removes impurities from the dregs, according to the above mentioned example, alkali. At the same time the water penetrating the filtering surface washes the filtering surface improving the filtration capacity. The dregs are removed as sludge to be further treated and a new filtration cycle may be begun.

An even more efficient treatment of dregs is provided, if a cake is formed of dregs for washing. In this kind of process the apparatus is provided with a separate sludge vessel. There the recirculation pump draws the suspension to be recirculated from the sludge vessel, to which the sludge flows from the bottom of the filter. The process is started by filling the sludge vessel with suspension to be filtered, whereafter the recirculation and filtration of the suspension is started. Sludge from the filter is not removed from the sludge vessel, but it is allowed to thicken there, which takes place when liquid is removed as filtrate. When the solids content of the sludge is as desired, the bottom conduit of the filter is closed and the filter is allowed to be filled with sludge. The pressure difference still prevails in a full filter, whereby liquid is infiltrated through the filtering surface, on which a solids cake is generated. After the filtration the sludge remained between the filter elements or otherwise in the filter is removed and brought back to the sludge vessel. When the bottom of the filter is closed, a cake remains due to the pressure difference on the surface of the elements, from where the gas flowing through the cake and the filter element removes humidity. The generated cake is removed by washing with water and blowing with gas to be passed for further treatment (washing and drying).

In connection with such a batch process it is possible also to carry out dregs washing, now as an efficient displacement washing. So far it has been necessary to carry out the dregs washing in separate apparatuses. The washing takes place by filling the filter with water after the drying of the cake and by emptying the filtered water then to the washing vessel. The cake is finally removed, as above, by washing with water and blowing with gas and the dregs-water mixture is passed for further treatment.

If so desired the whole treatment of the material to be filtered, such as green liquor, is desired to be performed in the same apparatus (filter) the previous alternative may be further developed in such a way that after the washing and drying the cake is loosened dry by blowing and removed, for example, through the opened lower end of the filter.

In batch process it is possible to adjust the capacity by pressure difference or by extending the interval between the cycles.

BRIEF DESCRIPTION OF THE DRAWINGS

The present invention is described more in detail below, by way of example, with reference to the accompanying drawings in which.

DETAILED DESCRIPTION OF THE DRAWINGS

Figure 1:
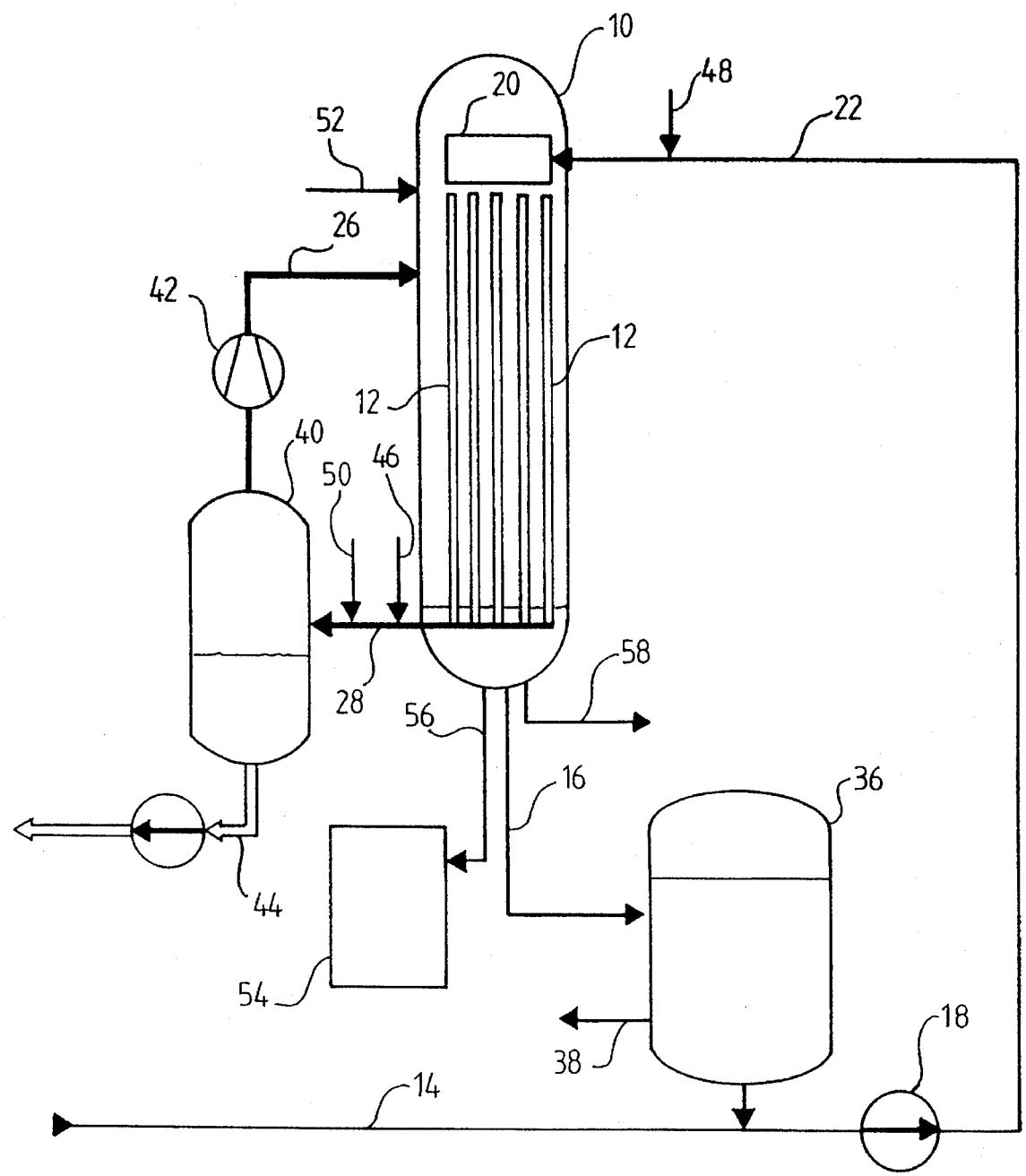
FIG. 1 schematically illustrates a preferred embodiment of the apparatus for realizing the invention.

The filtering apparatus in FIG. 1 comprises a pressure-proof vessel 10, to which vertical filter elements 12 are provided. Each filter element, lamella, preferably consists of two perforated plates coated with supporting and filtering cloth. The filter elements are suspended inside vessel 10 or otherwise appropriately attached so that the filtration in accordance with the invention is possible. The filter element is substantially in a vertical position, whereby the liquid film flows along the filtering surfaces of the filter element. The filter element may also be an element inclined relative to the normal.

Figure 2:
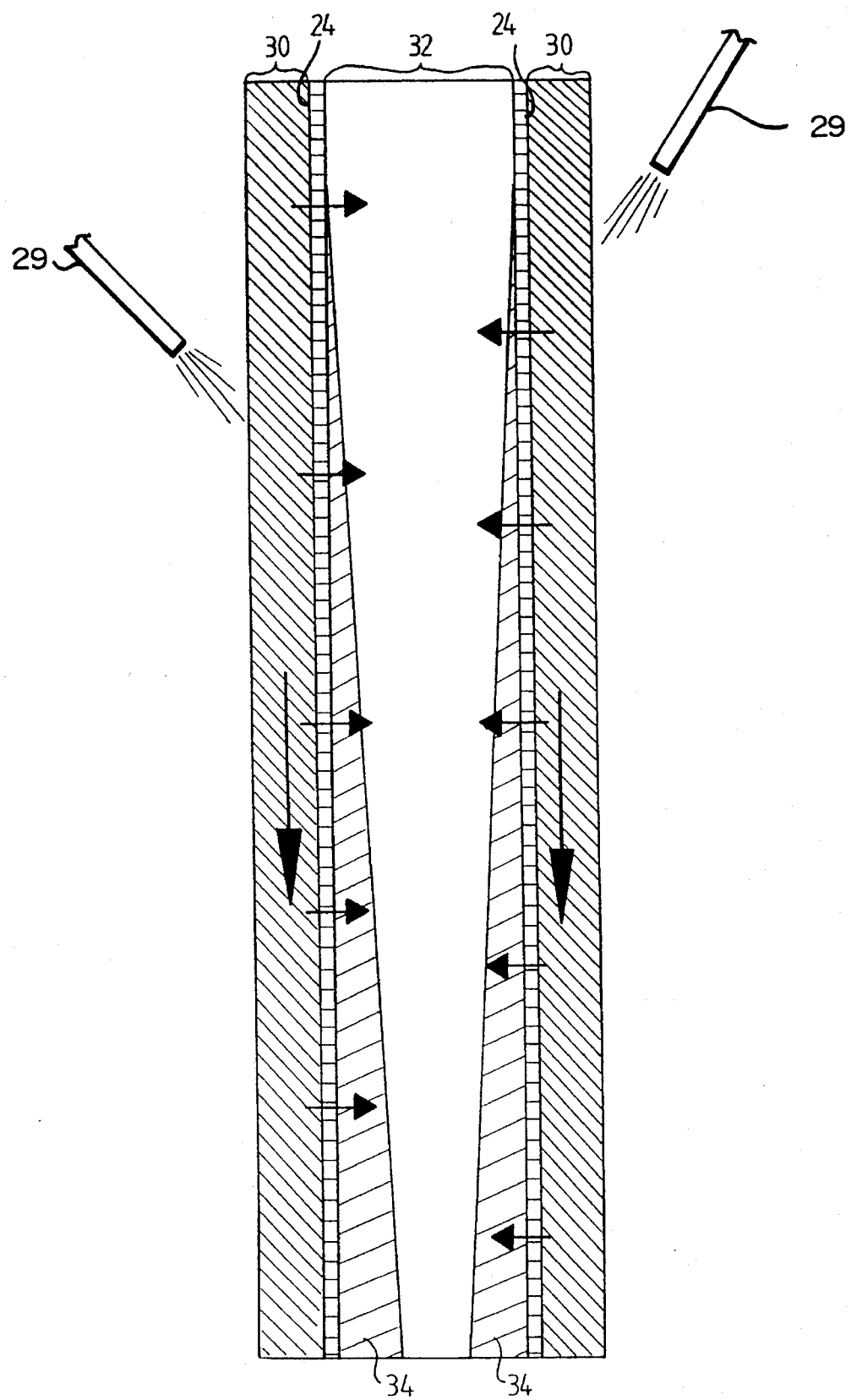
FIG. 2 schematically illustrates the principle of the filtering method according to the invention.

The suspension to be filtered is passed through a conduit 14 to the recirculation system of the filter, comprising a pipe line 16, 22 and a recirculation pump 18. The material to be filtered is passed to the upper part of the filter to a perforated plate 20, which has openings at each of the filter element, through which the material to be filtered may flow to the filtering surfaces of each filter element. When flowing due to the gravitational force along the filtering surfaces 24, as shown in FIG. 2, the liquid containing solids forms a dense liquid film 30 on the filtering surface, which film substantially prevents the pressurized gas in vessel 10 from penetrating the filtering surface. The pressure gas is passed to the vessel through conduit 26. Due to the pressure difference caused by the gas the filtrate penetrates through the filtering surface to the filtrate channel 32 surrounded by filtering surfaces, where filtrate 34 flows downwards and ends up in a discharge conduit 28 in the lower part of the element, along which the filtrates from all filter elements are discharged from vessel 10.

The non-filtered suspension accumulates to the bottom of the vessel, from where it is passed along conduit 16 to vessel 36 and is further recirculated to the upper part of the filter elements. In continuous filtration part of it is continuously discharged for further treatment along conduit 38. The sludge may be recirculated also directly from the bottom of the filter without an intermediary vessel 36.

The majority of the suspension to be recirculated flows down the filtering surface carrying the separated solids therewith. Thus it is possible to prevent the generation of the cake. The amount of the suspension to be recirculated must be such that an even and continuous falling film is generated on the filtering surface.

In the filtration the pressure difference may be reduced across filter element to remove a thin solids layer possibly attached to the filtering surface, whereby the filtration slows down and the layer loosens to be entrained with the downwards flowing liquid layer. The removal of the layer may be facilitated also by changing the pressure difference opposite, for example, by stopping the teed of the pressure gas from conduit 26 and by feeding gas from conduit 46 through filtrate channels.

The attachment of the solids on the filtering surface may be prevented also by providing vessel 10 or elements 12 with a vibration apparatus.

The filter elements 12 may be provided with one or more movable liquid jets 29 in order to increase the liquid flow locally on the filtering surface to prevent formation of a solids layer (filter cake).

In batch filtration process the apparatus in accordance with FIG. 1 operates in the following way. The sludge vessel 36 is filled with the suspension to be filtered through conduit 14 either through the filter (conduits 22 and 16) or by feeding directly (not shown) to the vessel. After filling the vessel 36 the filtration is begun by recirculating the suspension by a recirculation pump 18. The filtrate flows to the vessel 40. More suspension is supplied through conduit 14 according to the surface level of the sludge vessel. Sludge is not removed from the vessel 36, but it is allowed to be thickened there.

When the desired dregs concentration is achieved in the vessel 36, the bottom of the filter is closed and the recirculation pump 18 pumps the content of the vessel 36 to the vessel 10. Due to the pressure difference prevailing in the filter the filtrate is pressed through the filtering surface 24 and a cake is generated on the surface. In the end of the filtering cycle the non-filtered suspension is removed from the filter and returned to the vessel 36 through conduit 16. When the pressure difference prevails, the cake remains on the surface of the filtering element, through which the gas flowing therethrough removes water. The generated cake is removed by washing with water, which may be supplied, for example, through conduit 48 to the upper end of the elements or through conduit 50 from the inner part of the filter elements. Finally air may also be blown through conduit 46. Dregs-water mixture is removed to a separate open dregs vessel 54 along line 56.

Now the filter is ready to begin a new filtering cycle.

It is also possible to carry out the washing of the dregs in the same filter. There, prior to the removal of the cake conduit 16 is closed, vessel 10 is filled with water through conduit 48, 50 or 52. The washing water filtered through the cake is discharged to a separate washing water vessel through line 58. After the washing the cake is removed as described above.

The process may be further improved in such a way that the cake is removed dry. Consequently, after the removal of the washing water and the drying of the cake (gas through conduit 26) the cake is removed from the filtering surface by blowing gas through conduit 46, whereby the gas coming from the inside of the elements drops the cake to the bottom of the vessel 10, from which the cake may be removed, for example, by opening the bottom end of the vessel.

Figure 3:
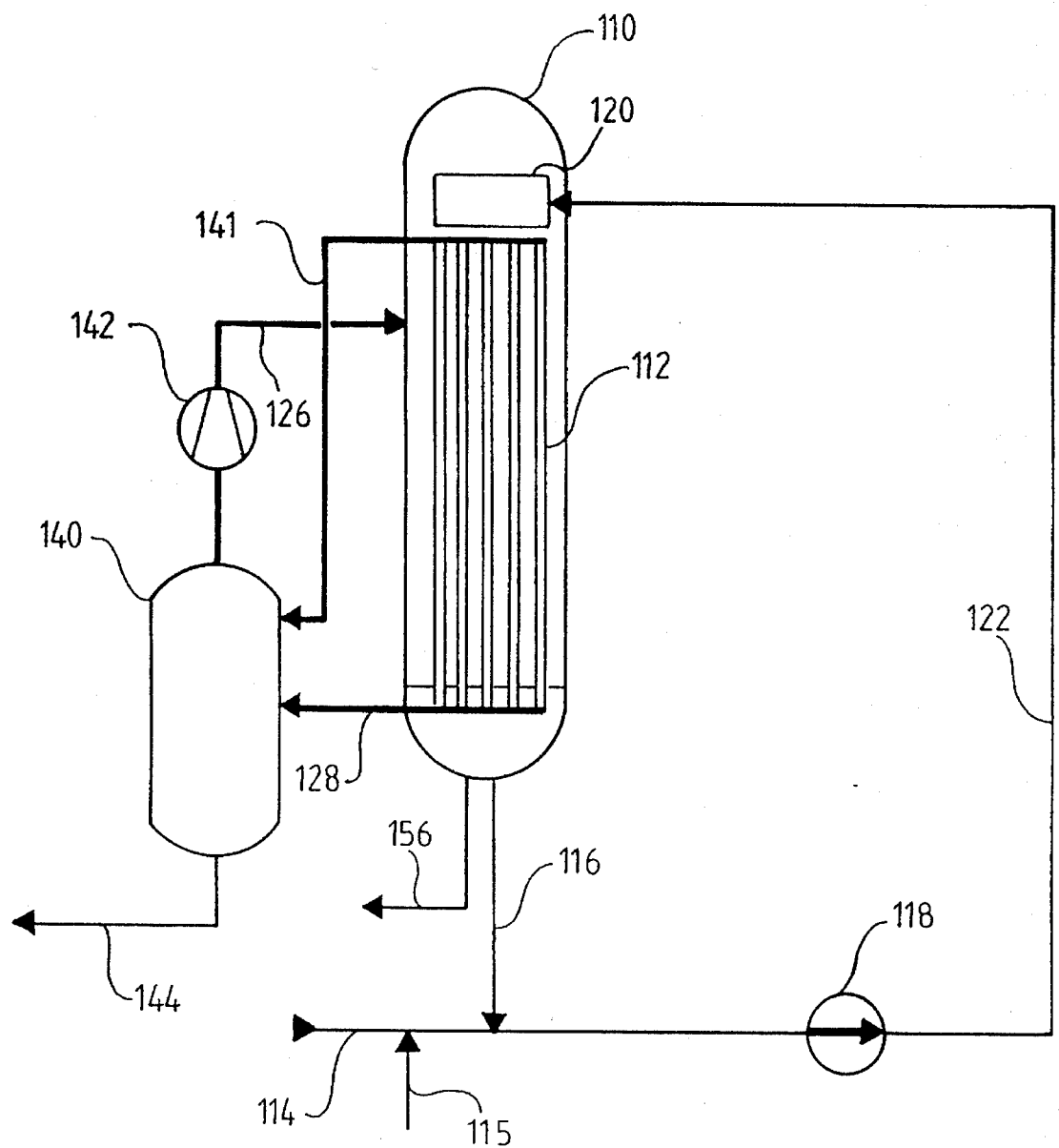
FIG. 3 schematically illustrates a second embodiment of the apparatus for realizing the invention.

It is illustrated in FIG. 3, how the batch filtration may be carried out in another way, if less dregs washing than that in the above described filtration is sufficient, whereby no filtration cake is formed during the washing, either. The reference numbers are analogous to those in FIG. 1, only they are preceded by "1".

The suspension to be filtered is passed through conduit 114 to the recirculation system of the filter, which system comprises a pipe line 116, 122 and a recirculation pump 118. Sludge is not discharged during the filtration cycle, but it is allowed to thicken and accumulate to the lower part of the filter. Also the feed of the suspension to be filtered from line 114 is stopped in order to thicken the sludge. Then washing water is supplied from line 115. Filtration is continued, whereby sludge is recirculated and washing water being mixed with the dregs removes impurities, such as alkali in the treatment of green liquor, from the dregs. Also a second cleaning effect is achieved with the washing water, when the water (filtrate) passing through the filtering surface washes the filtering surface and thus improves the filtration capacity, in other words the surface is cleaned for the next filtration cycle. After a sufficient washing, the dregs are discharged for further treatment through line 156, whereafter a new filtration cycle may begin.

In an apparatus in accordance with FIG. 2 a filtrate flow from the lower end of the element 12 is passed along conduit 28 to a separator 40, in which the gas possibly entrained with the filtrate to the separator, is separated. The separated gas is passed through a compressor 42 back to the pressure vessel 10 in the filtration process. The gas thus circulates in a closed system, which has the advantage that the gas does not react with the material being filtered. The filtrate is passed from the separator along conduit 44 for further treatment.

In the apparatus of FIG. 3 the gas which has passed through the filtering surface is discharged through the upper parts of the elements along line 141, whereas the filtrate is discharged from the lower part of the elements along line 128 as in FIG. 1. Since the gas is separated from the filtrate already in the element, the filtrate obtained is gas-free already in line 128, and a separate gas discharge vessel is not necessary. The pressure of the separated gas is raised in the blower 142 and the gas is returned to the filter vessel 110.

Following advantages are achieved with the present invention when applying it in the filtration of green liquor or like materials:

the cleanliness of the green liquor to be filtered is better secured; the settling and separation of the dregs in the green liquor varies in the clarifier;

the sludge volumes to be treated are smaller than in the clarifier, because the dregs content is higher. The sludge volumes to be treated are approximately ⅕ of the corresponding sludge amount in the clarifier;

the filtering apparatus requires considerably smaller space than the clarifier;

no filtering aids are required;

the filtering capacity is higher compared with the conventional cake filtration;

if batch process is used, longer filtration cycles are obtained than when using known batch filtration methods, such as the conventional cake filtration;

cleaning of green liquor and the treatment of the dregs separated therefrom is possible in the same apparatus (the cake may be removed dry), no separate dregs washing apparatus is required; and dilution washing of green liquor dregs is possible, whereby the treatment thereof with the actual dregs filter is facilitated.

We claim:

1. Filtering apparatus, comprising:

a housing;

a plurality of filter elements generally vertically mounted in said housing, and including a top and a bottom;

each filter element comprising a filter surface with first and second sides both substantially free of filter cake;

means for providing a higher gas pressure on said first sides of said filter surfaces with respect to said second sides;

a first conduit for withdrawing a filtrate from said second side of at least one of said surfaces;

a second conduit for withdrawing a suspension liquid from adjacent the bottom of said elements; and means for introducing a suspension onto said first sides of said surfaces, such that the suspension flows in a falling film down said first sides and in contact therewith, so that filter cake does not form during operation.

2. Apparatus as recited in claim 1 further comprising a sludge vessel connected to said second conduit, external of said housing.

3. Apparatus as recited in claim 2 further comprising an open dregs vessel, distinct from said sludge vessel, connected to a bottom portion of said housing.

4. Apparatus as recited in claim 3 wherein said introducing means comprising a tray with perforated bottom mounted above said filter elements.

5. Apparatus as recited in claim 2 further comprising recirculating means for recirculating suspension from said sludge vessel to said introducing means.

6. Apparatus as recited in claim 5 wherein said introducing means comprising a tray with perforated bottom mounted above said filter elements.

7. Apparatus as recited in claim 2 wherein said introducing means comprising a tray with perforated bottom mounted above said filter elements.

8. Apparatus as recited in claim 2 wherein said housing is gas-tight, and wherein said gas pressure providing means comprises means for introducing gas under pressure into said housing.

9. Apparatus as recited in claim 2 wherein said gas pressure providing means comprises means for applying a partial vacuum to said filter surface second sides.

10. Apparatus as recited in claim 1 wherein said introducing means comprising a tray with perforated bottom mounted above said filter elements.

11. Apparatus as recited in claim 10 wherein said introducing means further comprises at least one jet for directing suspension onto at least one of said filter surface first sides.

12. Apparatus as recited in claim 10 further comprising means for simultaneously withdrawing gas and filtrate through said first conduit.

13. Apparatus as recited in claim 10 further comprising means for withdrawing gas from said second sides of said filter surfaces distinctly from said first conduit.

14. Apparatus as recited in claim 1 wherein said housing is gas-tight, and wherein said gas pressure providing means comprises means for introducing gas under pressure into said housing.

15. Apparatus as recited in claim 1 wherein said gas pressure providing means comprises means for applying a partial vacuum to said filter surface second sides.

16. Apparatus as recited in claim 1 further comprising means for withdrawing gas from said second sides of said filter surfaces distinctly from said first conduit.

17. Apparatus as recited in claim 1 further comprising means for simultaneously withdrawing gas and filtrate through said first conduit.

18. Apparatus as recited in claim 17 wherein said means for simultaneously withdrawing gas and filtrate through said first conduit and said means for providing the gas pressure, comprises a vessel having said second conduit as an inlet thereto, a gas outlet from said vessel, a gas space in said vessel, and a compressor connected to said gas outlet.

19. Apparatus as recited in claim 1 wherein said introducing means includes at least one nozzle for directing suspension onto at least one of said filter surfaces first sides.

* * * * *